(12) United States Patent
Anderson

(10) Patent No.: US 7,605,326 B2
(45) Date of Patent: Oct. 20, 2009

(54) SOLAR ELECTROLYSIS POWER CO-GENERATION SYSTEM

(76) Inventor: Christopher M. Anderson, 2172 Clover St., Simi Valley, CA (US) 93065

( * ) Notice: Subject to any disclaimer, the term of this patent is extended or adjusted under 35 U.S.C. 154(b) by 724 days.

(21) Appl. No.: 10/721,929

(22) Filed: Nov. 24, 2003

(65) Prior Publication Data

US 2005/0109394 A1 May 26, 2005

(51) Int. Cl.
*H01L 31/00* (2006.01)
*H01M 8/18* (2006.01)

(52) U.S. Cl. .............. 136/248; 429/21; 204/228.1; 204/228.2; 204/228.4; 204/228.5; 204/228.6; 204/278

(58) Field of Classification Search .............. 136/248; 429/21; 204/228.1–228.6, 278
See application file for complete search history.

(56) References Cited

U.S. PATENT DOCUMENTS

| | | | |
|---|---|---|---|
| 5,690,797 A * | 11/1997 | Harada et al. ............ 204/228.5 |
| 5,711,865 A * | 1/1998 | Caesar ..................... 205/628 |
| 5,833,831 A * | 11/1998 | Kitajima et al. .......... 205/349 |
| 6,372,978 B1 * | 4/2002 | Cifaldi .................... 136/248 |
| 6,569,298 B2 * | 5/2003 | Merida-Donis .......... 204/263 |
| 7,459,064 B2 * | 12/2008 | Anderson ................ 204/228.1 |
| 2002/0039534 A1 * | 4/2002 | Moroi et al. ............. 417/372 |

FOREIGN PATENT DOCUMENTS

JP 09139217 A * 5/1997

\* cited by examiner

*Primary Examiner*—Jeffrey T. Barton
(74) *Attorney, Agent, or Firm*—Kinney & Lange PA

(57) ABSTRACT

A solar electrolysis power co-generation system includes a solar electrolysis source and a control unit. The solar electrolysis source includes a solar panel, an electrolysis unit, a hermetically sealed compressor, a hydrogen tank, and a hydrogen-powered fuel cell and produces, compresses, and stores hydrogen gas that is used to fuel the fuel cell. The control unit includes an inverter, a microprocessor, and a modem. The control unit connects the solar electrolysis power source with a power grid and with an individual consumer having an electrical load. The power co-generation system utilizes the electrolysis of water and solar energy to power a fuel cell. The energy produced with the fuel cell may be provided to an existing power gird as well as to an individual consumer. Further a method for decentralized power co-generation includes the step of providing a plurality of solar electrolysis power co-generation systems.

27 Claims, 1 Drawing Sheet

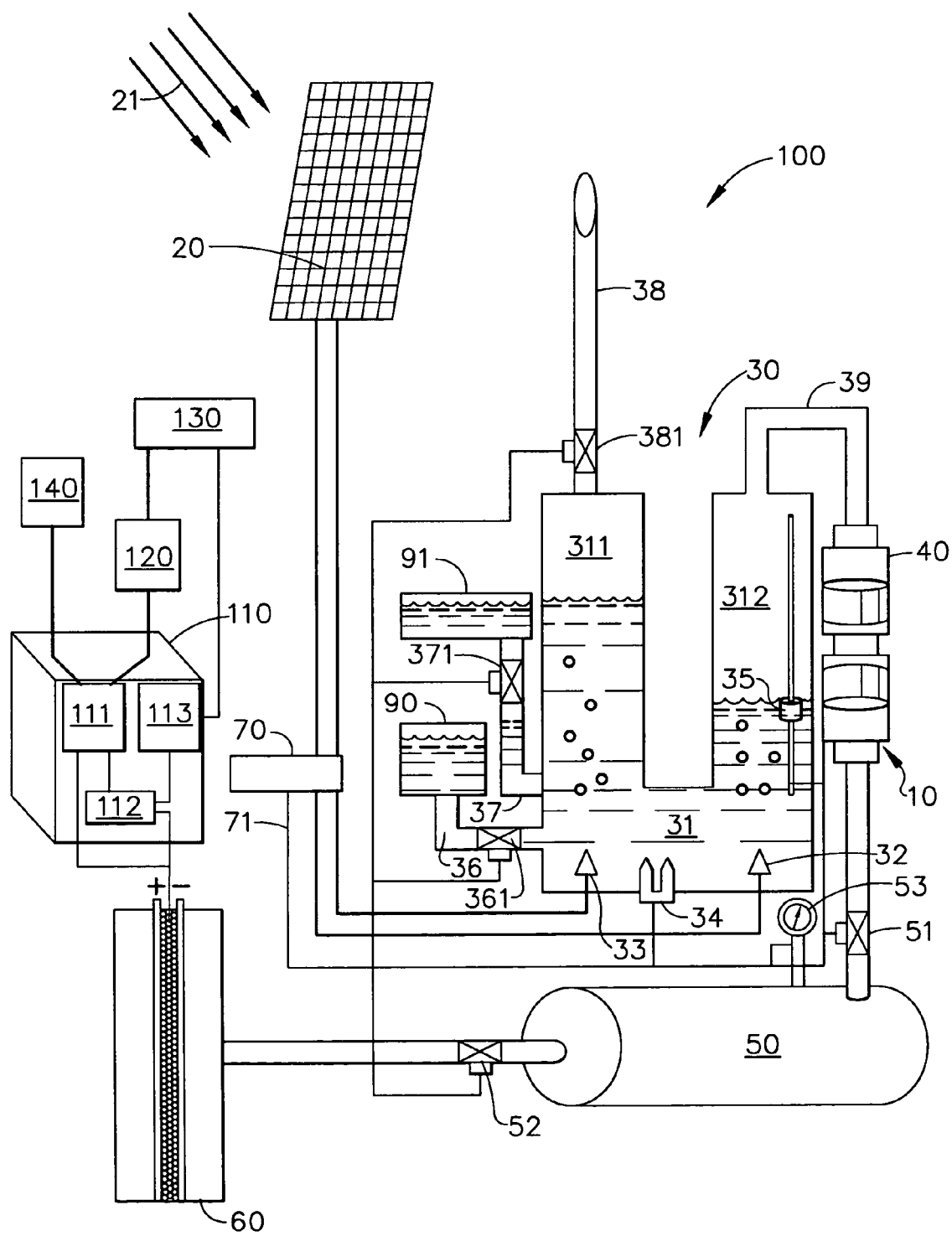

SOLAR ELECTROLYSIS POWER CO-GENERATION SYSTEM

BACKGROUND OF THE INVENTION

The present invention generally relates to power generation systems and, more particularly, to a power co-generation system that utilizes the electrolysis of water and solar energy to power a fuel cell and to a method for decentralized power co-generation.

Currently, many existing state and municipal power grids are incapable of handling peak loads. Interstate transmission lines, for example, run at or above design limits. This may lead to an interruption of the power transmission through the existing power grid during times of peak power demand. The construction of new power plants and power transmission systems involves long lead times and high costs. Furthermore, existing power grids are susceptible, for example, to technical problems, severe weather conditions, and terrorist acts. Therefore, the economy and the public safety may be endangered by frequent or extended power outages.

Back-up units that are currently used to generate electricity in case of a power outage run mostly on gasoline or diesel. These prior art back-up units require the storage of gasoline or diesel at all times and have a running time that is limited by the amount of fuel stored. After running these prior art back-up units to produce electricity, refueling of the fuel storage tanks is necessary.

Furthermore, the current world economy is mostly a fossil fuel economy. Fossil fuels such as petroleum products, for example, gasoline and diesel are currently used almost exclusively to power automobiles, trains, planes, etc. A huge percentage of current power plants use oil, natural gas, and coal for their fuel. The usage of fossil fuel creates problems, such as air pollution, environmental pollution, global warming, and dependency on availability of these natural resources. Also, fossil fuels are limited while the demand is increasing. Therefore, new forms for energy storage and production must be found.

With the development of hydrogen-powered fuel cells, a shift from the fossil fuel economy towards a hydrogen economy has become a possibility. Fuel cells chemically combine hydrogen with oxygen to generate electricity. Hydrogen powered fuel cells offer many advantages. They run on a combustion-free process that is safe, quiet, reliable and, most importantly, clean. Fuel cells don't contribute to smog or acid rain. Heat and water are the only byproducts of the electrochemical process that takes place within a fuel cell.

Currently, however, the operation of hydrogen powered fuel cells, for example, in hydrogen powered vehicles or portable power equipment, is not practical due to the lack of production, transportation, and dispensing infrastructure of hydrogen gas. In addition, filling of hydrogen gas into storage tanks is a dangerous process.

There has, therefore, arisen a need to provide a power generation system that is able to stabilize the power transmission through the existing power grids. There has further arisen a need to provide a power generation system that is able to provide power to individual consumers, for example to houses, municipal buildings, hospitals, and manufacturing plants, in case of an interruption of the power transmission through the existing power grid. There has still further arisen a need to provide a power generation system that is able to provide back-up power during power outages for extended times compared to prior art back-up systems. There has still further arisen a need to provide a power generation system that eliminates the use of fossil fuels and is, therefore, environmentally friendly. There has still further arisen a need to provide a power generation system that eliminates the immediate construction of new power plants and power transmission systems, thus saving high costs. There has also arisen a need to provide a power generation system that includes a power source that makes the use of hydrogen gas economical, practical and safe. There has also arisen a need to provide a power generation system that uses hydrogen but eliminates the problems associated with the production, transportation, and refueling of hydrogen gas.

As can be seen, there is a need for a power co-generation system that is able to generate electrical power. There is a further need to provide a power co-generation system that is able to supply electricity to individual consumers, for example to houses, municipal buildings, hospitals, and manufacturing plants, in case of an interruption of the power transmission through existing power grids, such as interstate transmission lines, state and municipal power grids, as well as to supply electricity to the existing power gird during times of peak power demand. Furthermore, there is a need to provide a decentralized power co-generation system. Still further, there is a need to provide a power co-generation system that operates without using fossil fuels. Also, there is a need for a power co-generation system that enables the use of hydrogen in a safe, environmentally friendly, economical process. Moreover, there is a need to provide a method for decentralized power co-generation without use of fossil fuels that enables supplying power to individual consumers, such as houses, municipal buildings, hospitals, and manufacturing plants, as well as to an existing power grid.

SUMMARY OF THE INVENTION

The present invention provides a power co-generation system that utilizes the electrolysis of water and solar energy to power a fuel cell. The present invention further provides a solar electrolysis power co-generation system that is suitable for, but not limited to, providing electrical power to individual consumers, for example to houses, municipal buildings, hospitals, and manufacturing plants, as well as to an existing power grid, such as interstate transmission lines, state and municipal power grids. The present invention still further provides a method for decentralized power co-generation by utilizing the electrolysis of water and solar energy to power a fuel cell.

In one aspect of the present invention, a solar electrolysis power co-generation system comprises a solar electrolysis power source including a solar panel, an electrolysis unit, a hermetically sealed compressor, a hydrogen tank, and a hydrogen-powered fuel cell and a control unit including an inverter, a microprocessor, and a modem. The microprocessor is connected with the modem, the inverter, and the hydrogen-powered fuel cell. The inverter is connected with the hydrogen-powered fuel cell. The microprocessor controls the inverter and the hydrogen-powered fuel cell.

In another aspect of the present invention, a solar electrolysis power co-generation system comprises a solar electrolysis power source including a solar panel, an electrolysis unit, a hermetically sealed compressor, a hydrogen tank, and a hydrogen-powered fuel cell and a control unit including an inverter, a microprocessor, and a modem. The microprocessor is connected with the modem, the inverter, and the hydrogen-powered fuel cell. The inverter is connected with the hydrogen-powered fuel cell. The microprocessor controls the inverter and the hydrogen-powered fuel cell. The inverter is connected with a power grid that is monitored and controlled by a local power utility. The inverter is connected with an individual consumer. The microprocessor is linked to the local power utility through the modem.

In still another aspect of the present invention, a solar electrolysis power co-generation system comprises solar electrolysis power source and a control unit. The control unit includes an inverter, a microprocessor, and a modem. The microprocessor is connected with the modem, the inverter, and the hydrogen-powered fuel cell. The inverter is connected with the hydrogen-powered fuel cell. The microprocessor controls the inverter and the hydrogen-powered fuel cell. The inverter is connected with a power grid that is monitored and controlled by a local power utility. The inverter is connected with an individual consumer. The microprocessor is linked to the local power utility through the modem. The solar electrolysis power source includes a water tank holding water, an electrolysis unit, a solar panel, an AC power source, a hermetically sealed compressor, a hydrogen tank, a fuel cell, a system controller, and a data and control bus. The electrolysis unit is connected with the source of water, receives water from the source of water, provides the electrolysis of the water, and produces hydrogen gas and oxygen gas. The solar panel is connected with the electrolysis unit, receives solar rays, and provides electrical energy to the electrolysis unit. The AC power source is connected with the electrolysis unit and provides electrical energy to the electrolysis unit. The hermetically sealed compressor is connected with the electrolysis unit and receives the hydrogen gas from the electrolysis unit. The hydrogen tank is connected with the hermetically sealed compressor and receives the hydrogen gas from the hermetically sealed compressor. The fuel cell is connected with the hydrogen tank receives the hydrogen gas from the hydrogen tank. The system controller is connected with the solar panel, the AC power source, the electrolysis unit, the hermetically sealed compressor, and the hydrogen tank. The data and control bus connects the system controller with the pH sensor, the water level sensor, the water fill valve, the electrolyte fill valve, the oxygen vent valve, the hydrogen tank fill valve, the hydrogen tank output valve, the pressure gauge of the hydrogen tank, and the hermetically sealed compressor. The electrolysis unit comprises an electrolysis chamber including an oxygen chamber and a hydrogen chamber, a cathode located within the hydrogen chamber, an anode located within the oxygen chamber, a pH sensor located within the electrolysis chamber, a water level sensor located within the electrolysis chamber, a water fill inlet including a water fill valve, an electrolyte tank containing an electrolyte and including an electrolyte fill inlet and an electrolyte fill valve, an oxygen vent including an oxygen vent valve, and a hydrogen vent. The electrolysis chamber is connected with the water tank and receives water from the water tank. The cathode is connected with the solar panel creating a negative charge at the cathode. The anode is connected with the solar panel creating a positive charge at the anode. The water fill inlet connects the electrolysis chamber with the source water tank. The electrolyte fill inlet connects the electrolyte tank with the electrolysis chamber. The oxygen vent connects the oxygen chamber of the electrolysis chamber with the outside atmosphere. The hydrogen vent connects the hydrogen chamber of the electrolysis chamber with the hermetically sealed compressor. The hydrogen tank comprises a hydrogen tank fill valve, a hydrogen tank output valve, and a pressure gauge. The hydrogen tank fill valve is located between the hermetically sealed compressor and the hydrogen tank. The hydrogen tank output valve is located between the hydrogen tank and the fuel cell. The pressure gauge indicates the pressure of the hydrogen gas stored inside the hydrogen tank.

In still another aspect of the present invention, a solar electrolysis power co-generation system comprises a solar electrolysis power source including a solar panel, an electrolysis unit, a hermetically sealed compressor, a hydrogen tank, and a hydrogen-powered fuel cell and a control unit including an inverter, a microprocessor, and a modem. The solar electrolysis power source produces, compresses, and stores hydrogen gas. The hydrogen gas is provided to fuel the hydrogen-powered fuel cell. The microprocessor is connected with the modem, the inverter, and the hydrogen-powered fuel cell. The inverter is connected with the hydrogen-powered fuel cell. The microprocessor controls the inverter and the hydrogen-powered fuel cell. The inverter is connected with a local power grid and with a house having an electrical load. The local power grid is monitored and controlled by a local power utility. The microprocessor is linked to the local power utility through the modem.

In a further aspect of the present invention, a method for decentralized power co-generation comprises the steps of: providing a solar electrolysis power co-generation system that includes a solar electrolysis power source and a control unit; connecting the solar electrolysis power co-generation system with an individual consumer having an electrical load; connecting the solar electrolysis power co-generation system with a local power grid; sending a first signal from the local power utility to the control unit indicating demand for electrical power; activating the solar electrolysis power source and providing electrical power to the local power grid; sending a second signal from the local power utility to the control unit indicating no demand for electrical power; and shutting down the operation of the solar electrolysis power source.

In still a further aspect of the present invention, a method for decentralized power co-generation comprises the steps of: providing a solar electrolysis power co-generation system that includes a solar electrolysis power source and a control unit; connecting the solar electrolysis power co-generation system with an individual consumer having an electrical load; connecting the solar electrolysis power co-generation system with a local power grid; detecting interruption of power transmission through the local power grid with the control unit; disconnecting the solar electrolysis power source from the local power grid with the control unit; activating the solar electrolysis power source; producing electrical power with the solar electrolysis power source; and providing the electrical power produced with the solar electrolysis power source to the individual consumer.

These and other features, aspects and advantages of the present invention will become better understood with reference to the following drawings, description and claims.

BRIEF DESCRIPTION OF THE DRAWINGS

FIG. 1 is a schematic view of a solar electrolysis power co-generation system according to a one embodiment of the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, an embodiment of the present invention provides a solar electrolysis power co-generation system that utilizes the electrolysis of water and solar energy to power a fuel cell and to produce electrical power. The produced electrical power may be used to provide power to an individual consumer, such as houses, municipal buildings, hospitals, and manufacturing plants, as well as to an existing power grid as needed. Other uses of the solar electrolysis power co-generation such as supplying power to individual consumers in remote geographic areas as a stand-alone solution or in addition to existing power supplies are possible. Contrary to known prior art back-up power generating systems, the solar electrolysis power co-generation system includes a solar electrolysis power source that produces hydrogen gas from water through electrolysis powered by solar energy. Therefore, the solar electrolysis power co-generation system as in one embodiment of the present invention is independent from fossil fuels and the cost of operation is relatively low.

In one embodiment, the present invention provides a solar electrolysis power co-generation system that includes a solar electrolysis power source that provides the electrolysis of water and, therefore, the production of hydrogen gas powered by solar energy. Water can be a pollution free source of hydrogen. By using solar energy for the electrolysis, the production of hydrogen is independent from the use of fossil fuels that are currently used as main source for energy production. By utilizing the electrolysis of water powered by solar energy, a safe, environmentally benign, and cost-effective method of hydrogen gas production is provided. The hydrogen gas produced in the electrolysis unit is an energy storage medium as well as a fuel. Therefore, the hydrogen gas can be stored until needed to power, for example, a fuel cell.

An embodiment of the present invention further provides a solar electrolysis power source that includes a hermetically sealed compressor for compressing the hydrogen gas such that it may be stored in a hydrogen tank. By providing the hydrogen gas production, compression, and storage in a hermetically sealed unit as in one embodiment of the present invention, the safety hazards connected with the filling of hydrogen gas into storage tanks as currently done, can be eliminated. Furthermore, the hydrogen tank may be a subterranean hydrogen tank, further eliminating safety hazards.

An embodiment of the present invention further provides a solar electrolysis power source that includes a hydrogen-powered fuel cell for producing electrical power. The hydrogen-powered fuel cell may be connected directly with the hydrogen storage tank as in one embodiment of the present invention. By combining the production, the compression, the storage, and the delivery of the hydrogen to the fuel cell in one hermetically sealed unit as in one embodiment of the present invention, currently existing problems with the production, storage, delivery, and refueling of hydrogen can be eliminated. The hydrogen gas is hermetically sealed from production to use, eliminating currently existing refueling safety hazards. The solar electrolysis power source as in one embodiment of the present invention does not depend on a hydrogen-dispensing infrastructure, which presently does not exist. Furthermore, there is no need to transport the hydrogen gas over long distances, since it is produced where needed. Since only solar energy and water are needed for the hydrogen production through electrolysis, the cost of operation of the solar electrolysis power source is relatively low. Since the solar electrolysis power source as in one embodiment of the present invention combines the production, compression, and storage of hydrogen gas, which is used as fuel for a fuel cell, in one unit, it is possible to provide back-up in case of an interruption of the power transmission through an existing power grid for extended times compared with known prior art back-up systems that depend on fossil fuels, such as gasoline or diesel.

An embodiment of the present invention further provides a solar electrolysis power co-generation system that includes an inverter. The inverter allows that the electrical power produced by a fuel cell may be supplied to an individual consumer and to an existing power grid when demanded, for example, during times of peak power demand when the currently existing power grid is overloaded and might fail. Provided that a plurality of solar electrolysis power co-generation systems as in one embodiment of the present invention exist, the load on existing power grids, such as interstate transmission lines, state and municipal power grids, can be reduced and less new power plants may be needed. Furthermore, a decentralized power supply system, which may be created with a plurality of solar electrolysis power co-generation systems as in one embodiment of the present invention, would be less susceptible to acts of terrorists compared to the existing interstate power grid.

An embodiment of the present invention further provides a solar electrolysis power co-generation system that includes a microprocessor and a modem. The fuel cell and the inverter as in one embodiment of the present invention are controlled by a microprocessor, which is linked to a local power utility through the modem. Therefore, in the event of an interruption of the power transmission through an existing power grid, the solar electrolysis power co-generation system as in one embodiment of the present invention can be isolated from the existing power grid and can provide power to an individual consumer, such as houses, municipal buildings, hospitals, and manufacturing plants.

Referring now to FIG. 1, a schematic view of a solar electrolysis power co-generation system 100 is illustrated according to one embodiment of the present invention. The solar electrolysis power co-generation system 100 may include a solar electrolysis power source 10 and a control unit 110. The solar electrolysis power source 10 may include a solar panel 20, an electrolysis unit 30, a hermetically sealed compressor 40, a hydrogen tank 50, and hydrogen-powered fuel cell 60. The control unit 110 may include an inverter 111, a microprocessor 112, and a modem 113. The hydrogen-powered fuel cell 60 of the solar electrolysis power source 10 may be connected with the inverter 111 and the microprocessor 112 of the control unit 110. The inverter 111 of the control unit 110 may be further connected with a local power grid 120 and with an individual consumer 140. The local power grid may include, but is not limited to, interstate transmission lines, state and municipal power grids. The individual consumer 140 having an electrical load may include, but is not limited to, houses, municipal buildings, hospitals, and manufacturing plants. The power grid 120 may be connected with a local power utility 130. The power grid 120 may be monitored and controlled by the local power utility 130. Furthermore, the microprocessor 112 included in the control unit 110 may be linked to the local power utility 130 through the modem 113.

The solar electrolysis power source 10 may produce hydrogen gas through electrolysis powered by solar energy. The produced hydrogen gas may be used as fuel to power the fuel cell 60. The hydrogen-powered fuel cell 60 may produce electrical power that may be supplied to an individual consumer 140 and/or the local power grid 120 via the inverter 111. The inverter 111 may be preferably a 140 V 60 Hz inverter. The hydrogen-powered fuel cell 60 and the inverter 111 may be controlled by the microprocessor 112 that may be linked to the local power utility 130 through the modem 113. Thereby the safe operation of the solar electrolysis power co-generation system 100 through the local power utility 130 may be guaranteed.

If a need for additional power exists, for example, during times of peak power demand, the solar electrolysis power co-generation system 100 may be required to supply additional power to the local power grid 120. In such instance the local power utility 130 may send a signal via the modem 113 to the microprocessor 112. The microprocessor 112 may then start the operation of the fuel cell 60. The control unit 110 of the solar electrolysis power co-generation system 100 may perform a system safety check, synchronize the electrical phase of the electrical power provided by the hydrogen-powered fuel cell 60 with the electrical phase of the power of the local power grid 120, and provide power to the local grid 120 via the inverter 111. The power provided from the solar electrolysis power co-generation system 100 to the power grid 120 may be metered. Once the peak power demand has subsided, the local power utility 120 may send another signal to the microprocessor 112 of the solar electrolysis power co-generation system 100 to shut down the operation of the fuel cell 60.

Still another signal provided by the local power utility 130 to the microprocessor 112 via the modem 113 of the control unit 110 of the solar electrolysis power co-generation system 100 may shift the electrical load of the individual consumer 140, for example a house, from the local power grid 120 to the hydrogen-powered fuel cell 60 of the solar electrolysis power source 10. This may be necessary when the power grid 120 is overloaded or an interruption of the power transmission through the power grid 120 occurs. If an interruption of the power transmission through the power grid 120 occurs, the control unit 110 of the solar electrolysis power co-generation system 100 may have the ability to disconnect the inverter 111 from the local power grid 120 and to start the operation of the fuel cell 60 to provide electrical power to the individual consumer 140. Once the power transmission through the power grid 120 is working again, the local power utility 120 may resume providing power to the individual consumer 140. These processes may be controlled by the microprocessor 112.

The solar electrolysis power source 10 may further include a water tank 90 and a system controller 70. The electrolysis unit 30 provides the electrolysis of water and may include an electrolysis chamber 31, a cathode (negative electrode) 32, an anode (positive electrode) 33, a pH sensor 34, a water level sensor 35, a water fill inlet 36 including a water fill valve 361, an electrolyte tank 91, an electrolyte fill inlet 37 including an electrolyte fill valve 371, an oxygen vent 38 including an oxygen vent valve 381, and a hydrogen vent 39. The electrolysis chamber 31 may include an oxygen chamber 311 and a hydrogen chamber 312. The anode 33 may be located within the oxygen chamber 311, the cathode 32 may be located within the hydrogen chamber 312, and the pH sensor 34 may be positioned within the electrolysis chamber 31, preferably between the oxygen chamber 311 and the hydrogen chamber 312. The water tank 90 that is filled with water may be connected with the electrolysis chamber 31 via the water fill inlet 36 and the water fill valve 361. Instead of the water tank 90, any other available source of water may be used. The electrolyte tank 91 that is filled with an electrolyte, for example, sulfuric acid, may be connected with the electrolysis chamber 31 via the electrolyte fill inlet 37 and the electrolyte fill valve 371. The hydrogen tank may include a pressure gauge 53.

The solar panel 20 may be connected via the system controller 70 with the cathode 32 and the anode 33 of the electrolysis unit 30. The hydrogen vent 39 of the electrolysis unit 30 may be connected to the hermetically sealed compressor 40. The hermetically sealed compressor 40 may be connected via a hydrogen tank fill valve 51 to the hydrogen tank 50. The hydrogen tank 50 may be connected via a hydrogen tank output valve 52 with the fuel cell 60. The system controller 70 may be connected via a data and control bus 71 with the pH sensor 34, with the pressure gauge 53 of the hydrogen tank 50, with the hermetically sealed compressor 40, with water fill valve 361, with the electrolyte fill valve 371, with the oxygen vent valve 381, with the water level sensor 35, with the hydrogen tank fill valve 51, and with the hydrogen output valve 52.

The solar panel 20 may receive solar rays 21 during daylight hours and may provide electrical energy to the electrolysis unit 30. Electrical energy is needed for electrolysis of water that takes place in the electrolysis unit 30. The electrical energy provided by the solar panel 20 may be transmitted via the system controller 70 to the electrolysis unit 30 such that a negative charge is created at the cathode 32 and a positive charge is created at the anode 33. The electrolysis chamber 31 may be filled with water from the water tank 90 or any other source of water via the water fill inlet 36 and the water fill valve 361 up to a preset level. The water level in the electrolysis chamber may be monitored and controlled by the system controller 70. The system controller 70 may be connected with the water level sensor 35 and the water fill valve 361. The water level may be adjusted by opening and closing the water fill valve 361. For example, when the water level reaches a preset minimum, the water fill valve 361 is opened to allow more water to flow into the electrolyte chamber 31 through the water fill inlet 36. Once a preset high water level is reached, the water fill valve 361 will be closed again. The system controller 70 may further monitor the pH level of the water. The system controller 70 may send signals over the data and control bus 71 to the electrolyte fill valve 371 to open or close the valve 371. By opening the electrolyte fill valve 371, an electrolyte, preferably sulfuric acid, may be added from the electrolyte tank 91 through the electrolyte fill inlet 37 to the water inside the electrolyte chamber 31 to obtain and maintain slightly acidic water. The water in the electrolyte chamber 31 needs to be slightly acidic with a pH value between 6 and 7 to allow transfer of charge between the cathode 32 and the anode 33. The electrical energy provided to the electrodes (cathode 32 and anode 34) stimulates the electrolysis of water, which produces oxygen gas at the anode 33 and hydrogen gas at the cathode 32. The oxygen gas may be collected in the oxygen chamber 311 and the hydrogen gas may be collected in the hydrogen chamber 312. The oxygen gas collected in the oxygen chamber 311 may be vented to the outside atmosphere through the oxygen vent 38 by opening the oxygen vent valve 381. The oxygen vent valve may be controlled by the system controller 70. The hydrogen gas collected in the hydrogen chamber 312 may be directed through the hydrogen vent 39 to the hermetically sealed compressor 40. The hermetically sealed compressor 40 may then pump the hydrogen gas into the hydrogen tank 50 for storage. The pressure inside the hydrogen tank 50 may be monitored by the pressure gauge 53 that is connected to the system controller 70. When the hydrogen tank 50 achieves maximum pressure, the system controller 70 causes the hydrogen tank fill valve 51 to close and disconnects the energy supply (the solar panel 20) in order to stop the production of hydrogen gas. When electrical power is required the hydrogen tank output valve 52 may be opened to allow hydrogen gas to enter the fuel cell 60. This process may also be monitored and controlled by the system controller 70 and the control unit 110. The hydrogen-powered fuel cell 60 will then provide electrical power that may be provided to the individual consumer 140 and/or the local power grid as needed.

A method for decentralized power co-generation may include the steps of: providing a plurality of solar electrolysis power co-generation systems 100 wherein each solar electrolysis power co-generation systems 100 may be connected to an individual consumer 140 having an electrical load, wherein each solar electrolysis power co-generation systems 100 may include a solar electrolysis power source 10 including a solar panel 20, an electrolysis unit 30, a hermetically sealed compressor 40, a hydrogen tank 50, and hydrogen-powered fuel cell 60, and wherein the solar electrolysis power source 10 may be connected with a control unit 110 including an inverter 111, a microprocessor 112 and a modem 113; connecting each of the solar electrolysis power co-generation systems 100 with a power grid 120; monitoring and controlling the power grid by a local power utility 130; linking the microprocessor 112 to the local power utility 130 through the modem 113; controlling the fuel cell 60 and the inverter 111 with the microprocessor 112; sending a signal from the local power utility 130 to the control unit 110 indicating demand for electrical power; activating the fuel cell 60, shifting the electrical load of each individual consumer 140 from the local power grid 120 to the solar electrolysis power source 10; providing power to the local power grid 120 and to the individual consumer 140 with the solar electrolysis power source 10; sending a signal from the local power utility 130 to the control unit 110 indicating no demand for electrical power; shutting down the operation of the fuel cell 60, shifting the electrical load of each individual consumer 140 from the solar electrolysis power source 10 to the local power grid 120; detecting interruption of power transmission trough the power grid 120; disconnecting the solar electrolysis power source 10 from the local power grid 120 using control unit 110; activating the fuel cell 60; producing electrical power; and providing electrical power to an individual consumer 140.

By providing a plurality of solar electrolysis power co-generation systems 100 and a method for decentralized power co-generation, the load on existing power grids 120 may be reduced and, therefore, less new power grids 120 may be needed. By providing each individual consumer 140, such as a house, with a solar electrolysis power co-generation system 100, the power supply to these individual consumers 140 will be guaranteed during interruptions of the power transmission through the existing power grid 120. By adding a plurality of solar electrolysis power co-generation systems 100 to the existing power grid 120, a power supply system with added decentralized power generation may be provided that is less susceptible to interruptions, such as those caused by acts of terrorists, than the existing power supply system. Furthermore, by producing the hydrogen gas as fuel for the fuel cell 60 directly where it is needed, power back-up may be provided for extended times in the event of a power outage.

It should be understood, of course, that the foregoing relates to preferred embodiments of the invention and that modifications may be made without departing from the spirit and scope of the invention as set forth in the following claims.

I claim:

1. A solar electrolysis power co-generation system, comprising:
   a solar electrolysis power source including:
     a solar panel;
     a source of water;
     a system controller;
     a hermetically sealed compressor;
     an electrolysis unit including:
       an electrolyte tank for containing an electrolyte;
       an electrolysis chamber including an oxygen chamber and an hydrogen chamber, wherein said electrolysis chamber is connected with said source of water, and wherein said electrolysis chamber receives water from said source of water;
       a cathode located within said hydrogen chamber, wherein said cathode is connected with said solar panel creating a negative charge at said cathode;
       an anode located within said oxygen chamber, wherein said anode is connected with said solar panel creating a positive charge at said anode;
       a pH sensor located within said electrolysis chamber;
       a water level sensor located within said electrolysis chamber;
       a water fill inlet including a water fill valve, wherein said water fill inlet connects said electrolysis chamber with said source of water;
       an electrolyte fill inlet and an electrolyte fill valve, wherein said electrolyte fill inlet connects said electrolyte tank with said electrolysis chamber;
       an oxygen vent including an oxygen vent valve, wherein said oxygen vent connects said oxygen chamber with an outside atmosphere; and
       a hydrogen vent, wherein said hydrogen vent connects said hydrogen chamber with said hermetically sealed compressor;
     a hydrogen tank;
     a hydrogen-powered fuel cell; and
     wherein said electrolysis unit is connected with said source of water and receives water from said source of water, and wherein said electrolysis unit provides electrolysis of said water and produces hydrogen gas and oxygen gas;
     wherein said solar panel is connected with said electrolysis unit, and wherein said solar panel receives solar rays and provides electrical energy to said electrolysis unit;
     wherein said hermetically sealed compressor is connected with said electrolysis unit, and wherein said hermetically sealed compressor receives said hydrogen gas from said electrolysis unit;
     wherein said hydrogen tank is connected with said hermetically sealed compressor, and wherein said hydrogen tank receives said hydrogen gas from said hermetically sealed compressor;
     wherein said system controller is connected with said solar panel, said electrolysis unit, said hermetically sealed compressor, and said hydrogen tank; and
     wherein said fuel cell is connected with said hydrogen tank, and wherein said fuel cell receives said hydrogen gas from said hydrogen tank; and
   a control unit including an inverter, a microprocessor, and a modem, wherein said microprocessor is connected with said modem, said inverter, and said hydrogen-powered fuel cell, wherein said inverter is connected with said hydrogen-powered fuel cell, and wherein said microprocessor controls said inverter and said hydrogen-powered fuel cell;
   wherein said inverter is connected with a power grid that is monitored and controlled by a local power utility, wherein said inverter is connected with an individual consumer, and wherein said microprocessor is linked to said local power utility through said modem.

2. The solar electrolysis power co-generation system of claim 1, wherein said solar electrolysis power source produces, compresses, and stores hydrogen gas, and wherein said hydrogen gas is provided to fuel said hydrogen-powered fuel cell.

3. The solar electrolysis power co-generation system of claim 1, wherein said inverter is a 140V 60 Hz inverter.

4. The solar electrolysis power co-generation system of claim 1, wherein said hydrogen tank comprises:
   a hydrogen tank fill valve, wherein said hydrogen tank fill valve is located between said hermetically sealed compressor and said hydrogen tank;
   a hydrogen tank output valve, wherein said hydrogen tank output valve is located between said hydrogen tank and said fuel cell; and
   a pressure gauge, wherein said pressure gauge indicates a pressure of said hydrogen gas stored inside said hydrogen tank.

5. The solar electrolysis power co-generation system of claim 1, wherein said solar electrolysis power source further comprises a data and control bus, wherein said data and control bus connects said system controller with said pH sensor, said water level sensor, said water fill valve, said electrolyte fill valve, said oxygen vent valve, and said hermetically sealed compressor.

6. The solar electrolysis power co-generation system of claim 5, wherein the data and control bus connects the system controller with the hydrogen tank fill valve, the hydrogen tank output valve, and the pressure gauge of the hydrogen tank.

7. The solar electrolysis power co-generation system of claim 1, wherein said electrolyte is added to said water contained within said electrolysis chamber creating a pH value between 6 and 7.

8. The solar electrolysis power co-generation system of claim 1, wherein said electrolyte is sulfuric acid.

9. The solar electrolysis power co-generation system of claim 1, wherein said water source is a water tank holding water.

10. The solar electrolysis power co-generation system of claim 1, wherein the pH sensor is positioned between the hydrogen chamber and the oxygen chamber.

11. The solar electrolysis power co-generation system of claim 1, wherein the pH sensor allows a system controller to monitor and control a pH of the water in the electrolysis chamber.

12. The electrolysis power co-generation system of claim 11, wherein the system controller controls the pH by triggering the release of the electrolyte into the electrolysis chamber.

13. A solar electrolysis power co-generation system, comprising:
   a solar electrolysis power source including:
      a water tank holding water;
      an electrolysis unit, wherein said electrolysis unit is connected with said water tank and receives said water from said water tank, wherein said electrolysis unit provides electrolysis of said water and produces hydrogen gas and oxygen gas, and wherein said electrolysis unit comprises:
         an electrolysis chamber including an oxygen chamber and a hydrogen chamber, wherein said electrolysis chamber is connected with said water tank and wherein said electrolysis chamber receives water from said water tank;
         a cathode located within said hydrogen chamber;
         an anode located within said oxygen chamber;
         a pH sensor located within said electrolysis chamber;
         a water level sensor located within said electrolysis chamber;
         a water fill inlet including a water fill valve, wherein said water fill inlet connects said electrolysis chamber with said water tank;
         an electrolyte tank containing an electrolyte and including an electrolyte fill inlet and an electrolyte fill valve, wherein said electrolyte fill inlet connects said electrolyte tank with said electrolysis chamber;
         an oxygen vent including an oxygen vent valve, wherein said oxygen vent connects said oxygen chamber of said electrolysis chamber with an outside atmosphere; and
         a hydrogen vent;
      a solar panel, wherein said solar panel is connected with said electrolysis unit via the anode and the cathode, and wherein said solar panel receives solar rays and provides electrical energy to said electrolysis unit by creating a negative charge at the cathode and a positive charge at the anode;
      a hermetically sealed compressor, wherein said hermetically sealed compressor is connected with the hydrogen vent of said electrolysis unit and wherein said hermetically sealed compressor receives said hydrogen gas from said electrolysis unit;
      a hydrogen-powered fuel cell, wherein said fuel cell is connected with said hydrogen tank, and wherein said fuel cell receives said hydrogen gas from said hydrogen tank;
      a hydrogen tank, wherein said hydrogen tank is connected with said hermetically sealed compressor, wherein said hydrogen tank receives said hydrogen gas from said hermetically sealed compressor, and wherein said hydrogen tank comprises:
         a hydrogen tank fill valve, wherein said hydrogen tank fill valve is located between said hermetically sealed compressor and said hydrogen tank;
         a hydrogen tank output valve, wherein said hydrogen tank output valve is located between said hydrogen tank and said fuel cell; and
         a pressure gauge, wherein said pressure gauge indicates pressure of said hydrogen gas stored inside said hydrogen tank;
      an AC power source;
      a system controller, wherein said system controller is connected with said solar panel, said AC power source, said electrolysis unit, said hermetically sealed compressor, and said hydrogen tank;
      a data and control bus, wherein said data and control bus connects said system controller with said pH sensor, said water level sensor, said water fill valve, said electrolyte fill valve, said oxygen vent valve, said hydrogen tank fill valve, said hydrogen tank output valve, said pressure gauge of said hydrogen tank, and said hermetically sealed compressor;
   a control unit including an inverter, a microprocessor, and a modem, wherein said microprocessor is connected with said modem, said inverter, and said hydrogen-powered fuel cell, wherein said inverter is connected with said hydrogen-powered fuel cell, and wherein said microprocessor controls said inverter and said hydrogen-powered fuel cell; and
   wherein said inverter is connected with a power grid that is monitored and controlled by a local power utility, wherein said inverter is connected with an individual consumer, and wherein said microprocessor is linked to said local power utility through said modem.

14. The solar electrolysis power co-generation system of claim 13, wherein said hydrogen-powered fuel cell provides power to a local power grid.

15. The solar electrolysis power co-generation system of claim 13, wherein said hydrogen-powered fuel cell provides power to an individual consumer having an electrical load.

16. The solar electrolysis power co-generation system of claim 15, wherein said individual consumer is a house.

17. The solar electrolysis power co-generation system of claim 16, wherein said microprocessor receives a first signal from said local power utility through said modem and shifts said electrical load of said house from said local power grid to said hydrogen-powered fuel cell.

18. The solar electrolysis power co-generation system of claim 16, wherein said control unit disconnects said inverter from said local power grid, wherein said control unit starts the operation of said hydrogen-powered fuel cell, and wherein said hydrogen-powered fuel cell provides power to said house.

19. The solar electrolysis power co-generation system of claim 16, wherein said microprocessor receives a fourth signal from said local power utility through said modem and shifts said electrical load of said house from said hydrogen-powered fuel cell to said local power grid.

20. The solar electrolysis power co-generation system of claim 13, wherein said oxygen gas is vented through said oxygen vent valve to the outside atmosphere.

21. The solar electrolysis power co-generation system of claim 13, wherein said oxygen is collected in said oxygen chamber of said electrolysis chamber.

22. The solar electrolysis power co-generation system of claim 13, wherein said hydrogen is collected in said hydrogen chamber of said electrolysis chamber.

23. The solar electrolysis power co-generation system of claim 13, wherein a pH value of said water contained in said electrolysis chamber is maintained between 6 and 7 by adding said electrolyte from said electrolyte tank.

24. The solar electrolysis power co-generation system of claim 13, wherein said microprocessor receives a first signal from said local power utility through said modem and starts operation of said hydrogen-powered fuel cell, and wherein said hydrogen-powered fuel cell provides electrical power to said local power grid via said inverter.

25. The solar electrolysis power co-generation system of claim 13, wherein said microprocessor receives a second signal from said local power utility through said modem and shuts down operation of said hydrogen-powered fuel cell.

26. The solar electrolysis power co-generation system of claim wherein the water level sensor allows a system controller to monitor and control a level of the water in the electrolysis unit.

27. The electrolysis power co-generation system of claim 26, wherein the system controller controls the level of the water in the electrolysis chamber by triggering the release of additional water from the water tank into the electrolysis chamber.

* * * * *

UNITED STATES PATENT AND TRADEMARK OFFICE
CERTIFICATE OF CORRECTION

| | | |
|---|---|---|
| PATENT NO. | : 7,605,326 B2 | Page 1 of 1 |
| APPLICATION NO. | : 10/721929 | |
| DATED | : October 20, 2009 | |
| INVENTOR(S) | : Christopher M. Anderson | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1617 days.

Signed and Sealed this

Fifth Day of October, 2010

David J. Kappos
*Director of the United States Patent and Trademark Office*